(12) United States Patent
Sandstrom et al.

(10) Patent No.: US 6,672,350 B2
(45) Date of Patent: Jan. 6, 2004

(54) TIRE WITH SHOCK ABSORBING CONFIGURED RUBBER TREAD

(75) Inventors: Paul Harry Sandstrom, Cuyahoga Falls, OH (US); Lewis Timothy Lukich, Akron, OH (US); Neil Arthur Maly, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 214 days.

(21) Appl. No.: 09/947,676

(22) Filed: Sep. 6, 2001

(65) Prior Publication Data

US 2003/0089438 A1 May 15, 2003

(51) Int. Cl.⁷ .......................... B60C 1/00; B60C 11/11; B60C 107/02
(52) U.S. Cl. ................... 152/209.12; 152/525; 152/905
(58) Field of Search .......................... 152/209.1, 209.5, 152/209.12, 209.13, 905, 525

(56) References Cited

U.S. PATENT DOCUMENTS

| | | | |
|---|---|---|---|
| 4,323,485 A | 4/1982 | Ahagon et al. | 525/237 |
| 4,342,670 A | 8/1982 | Ahagon et al. | 523/353 |
| 4,480,672 A | * 11/1984 | Marshall et al. | |
| 4,487,892 A | * 12/1984 | Ohmori et al. | |
| 4,624,296 A | 11/1986 | Takiguchi | 152/209 |
| 4,640,952 A | 2/1987 | Takiguchi et al. | 524/296 |
| 5,021,493 A | 6/1991 | Sandstrom | 524/347 |
| 5,063,268 A | * 11/1991 | Young | |
| 5,162,409 A | 11/1992 | Mroczkowski | 524/262 |
| 5,162,445 A | 11/1992 | Powers et al. | 525/333.4 |
| 5,206,283 A | 4/1993 | Kawakami et al. | 524/496 |
| 5,362,793 A | 11/1994 | Garro et al. | 524/495 |
| 5,886,106 A | 3/1999 | Sumner et al. | 515/332.8 |
| 5,889,123 A | 3/1999 | Schubart et al. | 525/330.7 |
| 6,062,282 A | * 5/2000 | Bonko | |

FOREIGN PATENT DOCUMENTS

| | | | | |
|---|---|---|---|---|
| GB | 837849 | * | 6/1960 | |
| JP | 59-128001 | * | 7/1984 | |
| JP | 5-001177 | | 1/1993 | C08L/9/06 |
| JP | 9-241430 | | 9/1997 | C08L/9/00 |
| JP | 11-166083 | | 6/1999 | C08L/23/26 |
| SU | 1625713 | * | 2/1991 | |

OTHER PUBLICATIONS

"Improvement of Tire Traction with Chlorobutyl Rubber", Keller on Chlorobutyl Improvement of Tire Traction, as presented to the American Society for Testing and Materials Committee F–9 Symposium on Tire Traction, Lanham, Maryland on May 10, 1972. pp. 190 through 201.

* cited by examiner

Primary Examiner—Steven D. Maki
(74) Attorney, Agent, or Firm—Henry C. Young, Jr.

(57) ABSTRACT

The invention relates to a pneumatic rubber tire with an outer, circumferential tread wherein said tread has a tread configuration comprised of spaced apart, raised lugs designed to be shock absorbingly ground contacting, wherein said tread and lugs are comprised of rubber selected from butyl rubber, halobutyl rubber or isobutylene-derived rubber. Said tire may also contain sidewalls comprised of one or more of such rubber. Thus, such tread is a combination of specific structural configuration and specific rubber composition to create a shock absorbing effect.

7 Claims, 2 Drawing Sheets

TIRE WITH SHOCK ABSORBING CONFIGURED RUBBER TREAD

FIELD OF THE INVENTION

Figure 1:
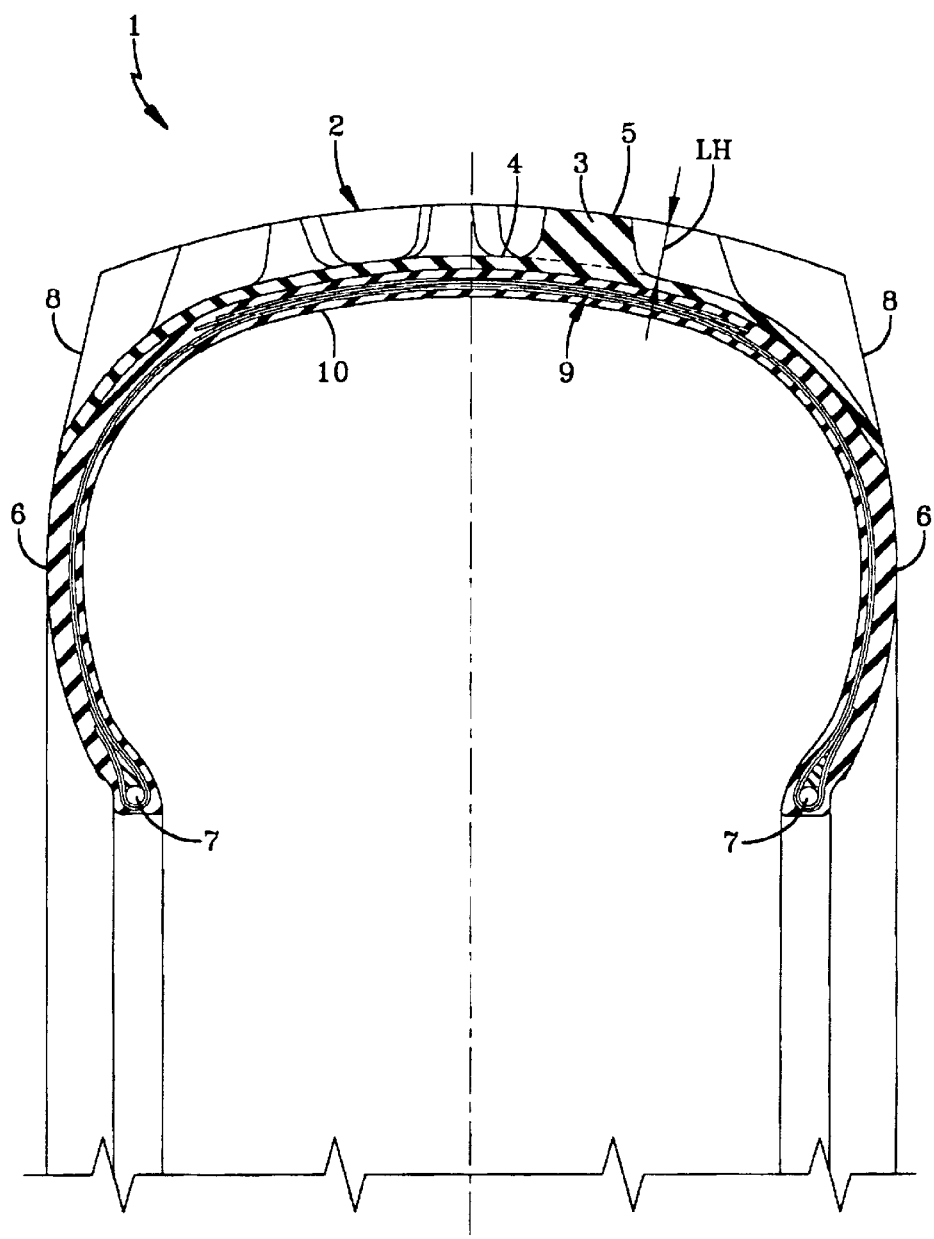

The invention relates to a pneumatic rubber tire with an outer, circumferential tread wherein said tread has a tread configuration comprised of spaced apart, raised lugs designed to be shock absorbingly ground contacting, wherein said tread and lugs are comprised of rubber selected from butyl rubber, halobutyl rubber or isobutylene-derived rubber. Said tire may also contain sidewalls comprised of one or more of such rubber. Thus, such tread is a combination of specific structural configuration and specific rubber composition to create a shock absorbing effect.

BACKGROUND OF THE INVENTION

Large pneumatic tires are used for various agricultural vehicles, such as for example tractors. Such tires may have a diameter, for example, of at least 58 inches (at least about 147 cm).

Such tire treads generally contain significantly raised lugs which are designed to be ground engaging.

It can readily be seen that such tractor tires, with lugs designed to be ground engaging, present only small portion of the tread to the ground, at least insofar as the surface of the lugs themselves are concerned as compared to typical passenger tire treads.

Accordingly, such tractor tires rely more on the weight of the associated tractor to provide tire tread traction over the ground than passenger tires.

Also, it can be readily visualized that shocks originating by the tire traveling over irregularities of the ground are readily transmitted to the wheel, and hence to the axle, of the associated vehicle and thereby to transmit the associated shock to the vehicle which, in turn, can result in a discomfort to the individual driving the vehicle.

In such circumstance, such agricultural vehicles typically rely upon the shock absorbency of the raised lug configuration of the tire tread to provide a degree of shock absorbency for the comfort of vehicle operator.

Accordingly, it remains desirable, in many circumstances, to increase the shock absorbency for such vehicles having a tread of such spaced apart, raised lug configuration.

While butyl rubber has heretofore been suggested for use in various tire treads, it is considered that such adaptation by this invention is a significant departure from past practice. In particular, this invention requires a combination of tread configuration with spaced apart significantly raised lugs designed to be ground engaging in combination with a shock absorbing rubber composition. Thus such lugs are designed to be shock absorbingly ground contacting.

In the description of this invention, terms such as "compounded rubber", "rubber compound" and "compound", if used herein, refer to rubber compositions composed of one or more elastomers blended with various ingredients, including curatives such as sulfur and cure accelerators. The terms "elastomer" and "rubber" might be used herein interchangeably. It is believed that all of such terms are well known to those having skill in such art.

A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined by a differential scanning calorimeter (DSC) at a temperature rate of increase of 10° C. per minute.

Disclosure and Practice of the Invention

In accordance with this invention, a pneumatic rubber tire is provided, particularly a farm tractor tire having a circumferential rubber tread configured with spaced apart raised lugs designed to be shock absorbingly ground contacting, a supporting carcass underlying said tread, a pair of spaced apart beads, and rubber sidewalls extending radially outward from said beads to the peripheral edges of said tread, wherein said raised lugs have a height from their surface intended to be ground contacting to the base thereof at the surface of said tread in a range of about 12.5 cm to about 80 cm, wherein the tread rubber composition of said tread and lugs is comprised of, based upon parts by weight per 100 parts by weight rubber (phr):

(A) about 70 to about 100, alternately about 75 to about 90, phr of at least one isobutylene-based rubber selected from
 (1) butyl rubber as a copolymer of isobutylene and isoprene wherein said copolymer contains from about 2 to about 6 weight percent units derived from isoprene,
 (2) halobutyl rubber as a halogenated butyl rubber where the halogen is selected from bromine or chlorine, preferably bromine, or
 (3) brominated copolymer of isobutylene and paramethylstyrene, and
(B) zero to about 30, alternately about 10 to about 25, phr of at least one diene-based elastomer selected from polymers of isoprene and/or 1,3-butadiene and copolymers of styrene with isoprene and/or 1,3-butadiene.

In an additional aspect of the invention, outer rubber sidewalls individually extending radially from the peripheral edge of said tread to spaced apart beads of the tire carcass which to the said tire are comprised of said isobutylene-based rubber composition which may be the same or different from the specific rubber composition used for said tire tread.

In a further aspect of the invention, a thin layer of a rubber composition as vulcanizable blend of diene-based rubber and one or more of said isobutylene-based rubbers, in a weight ratio of from 30/70 to 70/30 of such diene-based to said isobutylene-based rubbers, may be positioned between said tread and said carcass.

A significant aspect of the invention is the utilization of the prescribed shock absorbing rubbers for the significantly raised tread lugs as compared to diene-based rubbers of significantly reduced shock absorbing ability, particularly where the substantial tread lug rubber composition is required to have a rebound value (23° C.) of less than 25 and a Shore A hardness (23° C.) of greater than 60.

A further significant aspect of the invention is the utilization of said isobutylene-based rubber composition for said tire sidewalls, also with said rebound and hardness value characterizations, to extend the shock dampening effect from the tread to the tire carcass beads.

In particular, the so-called shock absorbing ability of the prescribed rubbers is largely dependent upon a damping effect of such rubbers for shocks experienced by such raised tread lugs and, in the practice of this invention, it is preferred and is intended to be required, that the tread rubber composition, particularly for the shock-absorbing tread lugs, has a significant dampening effect as exhibited by having a rebound physical property value (ASTM D 1054 at 23° C. of less than 25 and, further, also particularly for the shock-absorbing tread lugs, a sufficient stiffness to enhance the dimensional stability of the tread lugs as exhibited by a Shore A hardness value (ASTM D2240 at 23° C.) of greater than 60.

For such raised lug configured tread, said optional minor amount of a diene based rubber may be used to enhance cured adhesion of the tread rubber to a diene-based rubber composition of the tire carcass (or tread base) which supports the circumferential tread.

Such butyl rubber may be prepared, for example, by copolymerizing isobutylene with a minor amount of isoprene. The halobutyl rubber can be prepared by halogenating such butyl rubber, for example by brominating butyl rubber.

The brominated isobutylene/paramethylstyrene copolymer rubber typically has repeat units derived from polymerization of monomers comprising at least isobutylene and paramethylstyrene. The bromine content may be from about 0.1 to about 4 percent by weight and more desirably from about 0.1 to about 2.5 percent by weight, based upon the weight of the brominated polymer. The isobutylene content is desirably from about 85 to about 99.4, or up to about 99.8, alternately about 88 to about 97.9, weight percent. The paramethylstyrene content is usually from about 1 to about 14, alternately about 2 to about 11, weight percent. Repeat units of other monomers may also be present or may be excluded. Many such polymers are commercially available from Exxon Chemical company as Exxpro™ and a preparation of such polymers is exemplified, for example, in U.S. Pat. No. 5,162,445 which is hereby incorporated by reference in its entirety.

A drawing is provided in order to more fully describe the invention.

In the drawing, FIG. 1 is a cross-sectional view of a tire which illustrates a rubber tread and supporting carcass as well as a sidewall rubber portion of the tire.

Figure 2:
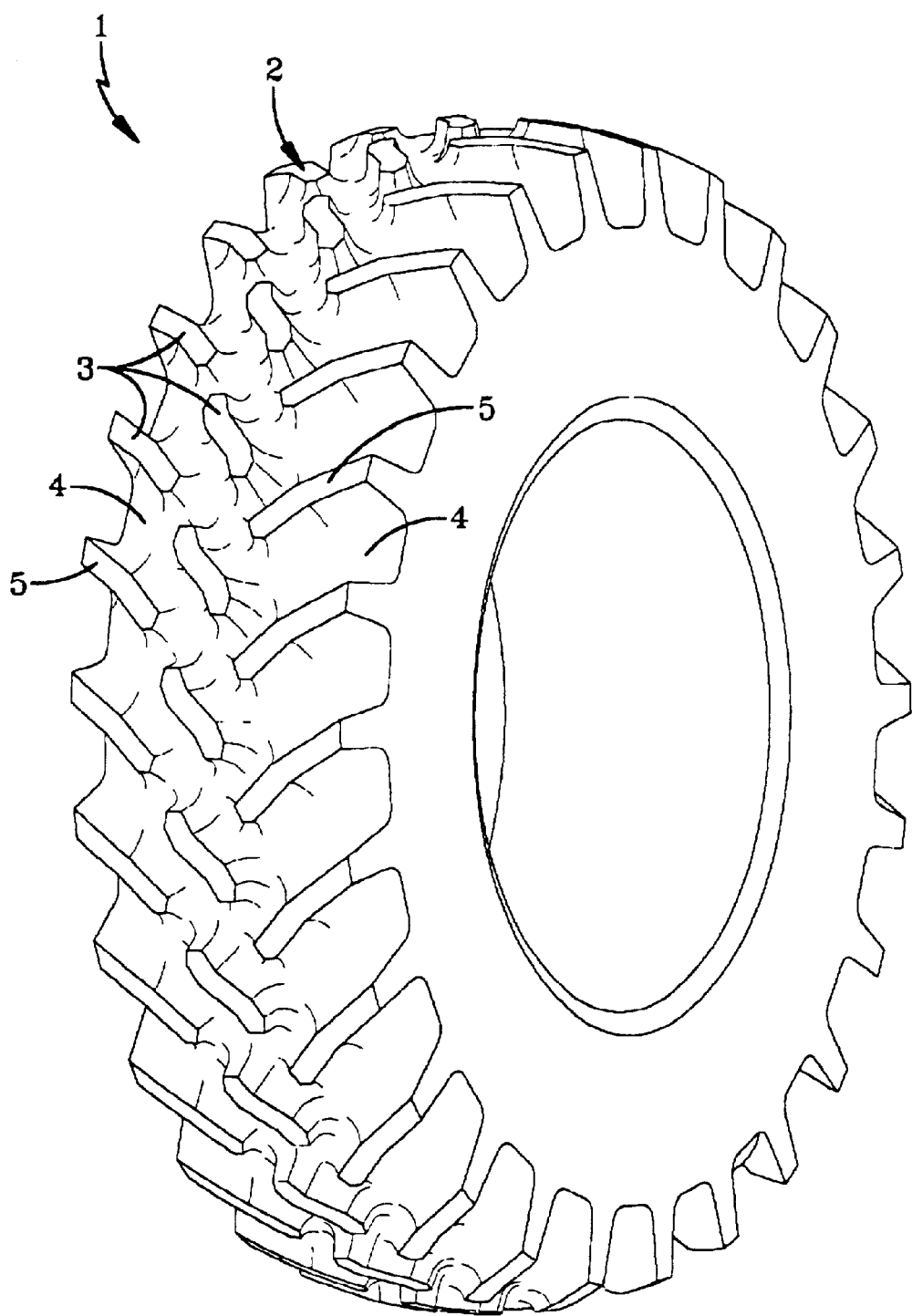

FIG. 2 is a perspective view of a tire showing spaced apart substantial tread lugs designed to be ground contacting.

In particular, a tire 1 is shown with a tread 2 configured with spaced apart substantial raised tread lugs 3 designed to be shock absorbingly ground contacting.

The raised tread lugs have a height from their base portion 4 to their surface 5 designed to be ground contacting of about 5.5 cm, or about 1.2 inches.

The tread 2 and associated tread lugs 3 are of a unitary shock-dampening rubber composition which comprises, based on parts by weight per 100 parts rubber (phr), of about 70 to 100 phr of butyl rubber and, correspondingly, about zero to 30 phr of sulfur curable diene-based rubber, characterized by having a rebound value at 23° C. of less than 25 and a dimensional stability stiffness characterized by a Shore A hardness value at 23° C. of at least 60.

In one aspect of the invention, the outer rubber sidewalls 6 are also of a dampening rubber composition comprised of about 70 to 100 phr of butyl rubber and, correspondingly, about zero to 30 phr of sulfur curable diene-based rubber, also characterized by having a rebound value at 23° C. of less than 25 and a Shore A hardness value at 23° C. of at least 60, although the sidewall rubber itself may be the same or different butyl/diene rubber ratio as the rubber composition for the tread.

By having both the tread and sidewalls of the tire being composed of the dampening rubber composition required to have a rebound value (23° C.) of less than 25, the dampening effect is substantially enhanced, particularly where the sidewalls 6 extend from the peripheral edges of the tread 8 to the beads 7 of the tire carcass 9. Such tread/sidewall construction which is combined with the required dampening rubber composition yields an additional benefit for the tire sidewall 6 itself by providing additional resistance to sidewall degradation due to exposure to environmental elements such as ozone as well as promoting a reduction in air permeability through the carcass 9 of the tire.

It is readily understood by those having skill in the art that the rubber compositions of the tread would be compounded with conventional compounding ingredients including reinforcing fillers such as carbon black and precipitated silica usually in combination with a silica coupling agent, as well as antidegradant(s), processing oil as hereinbefore defined, stearic acid or a zinc stearate, zinc oxide, sulfur-contributing material(s) and vulcanization accelerator(s).

Such compounding of rubber is well known to those having skill in such art. Antidegradants are typically of the amine or phenolic type. While stearic acid is typically referred to as a rubber compounding ingredient, it may be pointed out that the ingredient itself is usually obtained and used as a mixture of organic acids primarily composed of stearic acid with at least one of oleic acid, linolenic acid and/or palmitic acid normally contained in the stearic acid as typically used. The mixture may contain minor amounts (less than about six weight percent) of myristic acid, arachidic acid and/or arachidonic acid Such material or mixture is conventionally referred to in the rubber compounding art as stearic acid.

Where normal or typical rubber compounding amounts or ranges of amounts of such additives are used, they are not otherwise considered as a part of the invention. For example, some of the ingredients might be classified, in one aspect, as processing aids. Such processing aids may be, for example, waxes such as microcrystalline and paraffinic waxes typically used in a range of about 1 to 5 phr and often in a range of about 1 to about 3 phr; and resins, usually as tackifiers, such as, for example, synthetic hydrocarbon and natural resins typically used in a range of about 1 to 5 phr and often in a range of about 1 to about 3 phr. A curative might be classified as a combination of sulfur and sulfur cure accelerator(s) for the rubber compound (usually simply referred to as accelerator) or a sulfur donor/accelerator. In a sulfur and accelerator(s) curative, the amount of sulfur used is in a range of about 0.5 to about 5 phr and usually in a range of about 0.5 to about 3 phr; and the accelerator(s), often of the sulfenamide type, is (are) used in a range of about 0.5 to about 5 phr and often in a range of about 1 to about 2 phr. Alternatively, well known resin cure systems used for curing butyl rubber based rubber compositions may be used.

The ingredients, including the elastomers but exclusive of sulfur and accelerator curatives, are normally first mixed together in a series of at least two sequential mixing stages, although sometimes one mixing stage might be used, to a temperature in a range of about 145° C. to about 185° C., and such mixing stages are typically referred to as non-productive mixing stages. Thereafter, the sulfur and accelerators, and possibly one or more retarders and one or more antidegradants, are mixed therewith to a temperature of about 90° C. to about 120° C. and is typically referred as a productive mix stage. Such mixing procedure is well known to those having skill in such art.

After mixing, the compounded rubber can be fabricated such as, for example, by extrusion through a suitable die to form a tire tread. The tire tread and optionally the tire sidewall is then typically built onto a sulfur curable tire carcass and the assembly thereof cured in a suitable mold under conditions of elevated temperature and pressure by methods well-known to those having skill in such art. In such case of retreading of a tire, the tire tread might first be precured and then applied to the already cured tire carcass with a curable gum strip between the tread and carcass and the assembly then submitted to curing conditions to cure the aforesaid gum strip.

The invention may be better understood by reference to the following example in which the parts and percentages are by weight unless otherwise indicated.

EXAMPLE I

Rubber compositions were prepared and identified herein as Samples A through C, with Sample A and Sample B being Control Samples.

Control Sample A and Control Sample B was comprised of styrene/butadiene rubber and of cis 1,4-polyisoprene rubber, respectively. Sample C was comprised of butyl rubber.

Table 1 represents the respective rubber formulations.

TABLE 1

| Material | Control Sample A | Control Sample B | Sample C |
| --- | --- | --- | --- |
| Non-productive Mixing (4 minutes to 150° C.) | | | |
| Styrene/butadiene rubber1 | 100 | 0 | 0 |
| Cis 1,4-polyisoprene rubber[2] | 0 | 100 | 0 |
| Butyl rubber[3] | 0 | 0 | 100 |
| Carbon black[4] | 50 | 50 | 50 |
| Processing oil[5] | 5 | 5 | 5 |
| Fatty acid[6] | 2 | 2 | 2 |
| Zinc oxide | 5 | 5 | 5 |
| Antoxidant7 | 2 | 2 | 2 |
| Productive Mixing (2 minutes to 110° C.) | | | |
| Sulfur | 1 | 1.4 | 1.5 |
| Accelerators[8] | 2 | 1 | 2 |

[1]Emulsion polymerization prepared styrene/butadiene rubber obtained as Plioflex 1502 from The Goodyear Tire & Rubber Company
[2]Cis 1,4-polyisoprene rubber obtained as Natsyn 2200 from The Goodyear Tire & Rubber Company
[3]Butyl rubber as a copolymer of isobutylene and a minor amount of isoprene as Butyl 268 from the Exxon Chemical Company.
[4]N299, an ASTM designation
[5]Rubber processing oil, naphthenic/paraffinic type
[6]Primarily stearic acid
[7]Of the quinoline type
[8]Variously, of the sulfenamide, diphenylguanidine and mercaptobenzothiazole types The prepared rubber compositions were cured at a temperature of about 150° C. for about 36 minutes. Various properties of the Samples are reported in the following Table 2.

In Table 2, the term "MDR" refers to a "moving die rheometer" analytical instrument.

TABLE 2

| | Control Sample A | Control Sample B | Sample C |
| --- | --- | --- | --- |
| MDR Rheometer (150° C. Data) | | | |
| Maximum torque (dNm) | 17.2 | 18.3 | 13.1 |
| Minimum torque (dNm) | 2.3 | 2.5 | 2.7 |
| Delta torque | 14.9 | 15.8 | 10.6 |
| T90 (minutes) | 20 | 12.5 | 17.1 |
| Stress-Strain (Instron Instrument) | | | |
| Tensile, break-strength (MPa) | 24.5 | 22.5 | 14.4 |
| Elongation at break (%) | 472 | 456 | 665 |
| 100% modulus (MPa) | 2.1 | 1.9 | 1.5 |
| 300% modulus (MPa) | 13.5 | 13.1 | 5.3 |
| Hardness, Shore A | | | |
| 23° C. | 69 | 66 | 69 |
| 100° C. | 59 | 61 | 57 |
| Rebound | | | |
| 23° C. | 47 | 49 | 15 |
| 100° C. | 57 | 64 | 44 |

It can be seen from Table 2 that the rebound value at 23° C. for Sample C (using the butyl rubber based rubber composition) is dramatically lower than corresponding rebound values for both of Control Sample A (using the SBR based rubber composition) and Control Sample B (using the polyisoprene based rubber composition).

This is considered herein as being significant because the significantly lower rebound value of 15 for Sample C is indicative of a significantly higher damping property for the rubber composition which, in turn, is indicative of the significantly better shock absorbing ability for the relatively large tire tread raised lugs of this invention.

It can also be seen from Table 2 that the Shore A (23° C.) hardness value of 69 for the butyl rubber composition of Sample C is similar to the Control rubber Samples. This is significant because is it illustrates that the stiffness of Sample C is sufficient to promote an acceptable dimensional stability, (in combination with the aforesaid shock absorbing, or substantial shock dampening property) for the relatively large shock-absorbing tire lugs of this invention.

EXAMPLE II

Rubber compositions were prepared and identified herein as Samples D through I which contained butyl rubber.

Sample D contained only butyl rubber insofar as the elastomer of the rubber composition is concerned.

Samples E, F and G contained both butyl and bromobutyl rubbers.

Sample H contained butyl rubber, bromobutyl rubber and natural rubber.

Sample I contained butyl rubber and natural rubber.

Table 3 represents the respective rubber formulations.

It can be seen from Table 4 that the rebound values (23° C.) for Samples D through I are lower than a value of 25 percent. Such low rebound value is indicative of a significantly high damping property and therefore a high shock absorbing effect for the large, shock absorbing, tire lugs required for this invention.

It can also be seen from Table 4 that the Shore A (23° C.) hardness values for the Samples are at least 67. This is significant because is it illustrates that the stiffness of the Samples is sufficient to promote an acceptable dimensional stability, for the large, shock-absorbing, tire lugs required for this invention.

TABLE 3

| Material | Sample D | Sample E | Sample F | Sample G | Sample H | Sample I |
|---|---|---|---|---|---|---|
| Non-productive Mixing Stare | | | | | | |
| Butyl rubber[1] | 100 | 90 | 80 | 70 | 60 | 70 |
| Bromobutyl rubber[2] | 0 | 10 | 20 | 30 | 20 | 0 |
| Natural rubber[3] | 0 | 0 | 0 | 0 | 20 | 30 |
| Carbon black[4] | 50 | 50 | 50 | 50 | 45 | 40 |
| Processing aid[5] | 5 | 5 | 5 | 5 | 5 | 5 |
| Fatty acid[6] | 2 | 2 | 2 | 2 | 2 | 2 |
| Silica[7] | 0 | 0 | 0 | 0 | 5 | 10 |
| Productive Mixing Stage | | | | | | |
| Sulfur | 1 | 1 | 1 | 1 | 1 | 1 |
| Zinc oxide | 3 | 3 | 3 | 3 | 3 | 3 |
| Accelerators[8] | 2 | 2 | 2 | 2 | 2 | 2 |

[1]Butyl 268 from Exxon Chemical Company
[2]Bromobutyl 2222 from Exxon Chemical Company
[3]Cis 1,4-polyisoprene rubber
[4]N347, an ASTM designation
[5]Struktol 60NS from Struktol Chemical Company
[6]primarily stearic acid
[7]HiSil 210 from PPG Industries
[8]variously, dibenzothiazyl disulfide, mercaptobenzothiazole and tetramethyl thiuram disulfide The prepared rubber compositions were cured at a temperature of about 170° C. for about 20 minutes. Various properties of the Samples are reported in the following Table 4.

While certain representative embodiments and details have been shown for the purpose of illustrating the invention, it will be apparent to those skilled in this art that

TABLE 4

| Material | Sample D | Sample E | Sample F | Sample G | Sample H | Sample I |
|---|---|---|---|---|---|---|
| MDR Rheometer (170° C.) | | | | | | |
| Maximum torque (dNm) | 12.4 | 12.7 | 12.2 | 10.8 | 8.6 | 9.3 |
| Minimum torque (dNm) | 2.8 | 2.8 | 2.9 | 3 | 3.1 | 3 |
| Delta torque | 9.6 | 9.9 | 9.3 | 7.8 | 5.5 | 6.3 |
| T90 (minutes) | 7 | 9.9 | 10 | 10.5 | 2.6 | 1.1 |
| Stress-Strain, Instron Instrument | | | | | | |
| Tensile strength (MPa) | 13.1 | 15.1 | 15.9 | 16.3 | 4.4 | 4.4 |
| Elongation at break (%) | 682 | 526 | 496 | 491 | 426 | 308 |
| 100% modulus (MPa) | 1.4 | 1.7 | 1.8 | 1.8 | 2.3 | 2.2 |
| 300% Modulus (MPa) | 4.2 | 8.1 | 9.6 | 9.8 | 4.5 | 4.1 |
| Hardness, Shore A | | | | | | |
| 23° C. | 72 | 69 | 70 | 67 | 69 | 67 |
| 100° C. | 57 | 57 | 58 | 55 | 56 | 57 |
| Rebound | | | | | | |
| 23° C. | 15 | 14 | 13 | 13 | 20 | 22 |
| 100° C. | 38 | 46 | 47 | 49 | 51 | 52 | various changes and modifications may be made therein without departing from the spirit or scope of the invention.

What is claimed is:

1. A pneumatic rubber tire having a circumferential rubber tread configured with spaced apart raised lugs designed to be shock absorbingly ground contacting, a supporting carcass underlying said tread, a pair of spaced apart beads, and rubber sidewalls extending radially outward from said beads to the peripheral edges of said tread, wherein said raised lugs have a height from their surface intended to be ground contacting to the base thereof at the surface of said tread in a range of about 12.5 cm to about 80 cm, wherein the tread rubber composition of said tread and lugs is comprised of, based upon parts by weight per 100 parts by weight rubber (phr):

(A) about 70 to about 100 phr of brominated copolymer of isobutylene and paramethylstyrene, and (B) zero to about 30 phr of at least one diene-based elastomer selected from polymers of isoprene and/or 1,3-butadiene and copolymers of styrene with isoprene and/or 1,3-butadiene;

wherein said tread rubber has a rebound (23° C.) physical property value of less than 25 and a Shore A Hardness (23° C.) physical property value of at least 60.

2. The tire of claim 1 wherein rubber sidewalls individually extending radially from the spaced apart beads to the peripheral edges of said tread are comprised of at least one isobutylene-based rubber composition selected from (1) butyl rubber as a copolymer of isobutylene and isoprene wherein said copolymer contains from about 2 to about 6 eight percent units derived from isoprene, (2) halobutyl rubber as a halogenated butyl rubber where the halogen is bromine or chlorine, and (3) brominated copolymer of isobutylene and paramethylstyrene.

3. The tire of claim 1 wherein a thin layer of a rubber composition as a vulcanizable blend of diene-based elastomer(s) and said brominated copolymer of isobutylene and paramethylstyrene, in a weight ratio of from 30/70 to 70/30 of such diene-based elastomer(s) to said brominated copolymer of isobutylene and paramethylstyrene is positioned between said tread and said carcass.

4. The tire of claim 2 wherein a thin layer of a rubber composition as a vulcanizable blend of diene-based elastomer(s) and said brominated copolymer of isobutylene and paramethylstyrene, in a weight ratio of from 30/70 to 70/30 of such diene-based elastomer(s) to said brominated copolymer of isobutylene and paramethylstyrene, is positioned between said tread and said carcass.

5. The tire of claim 1 said tread rubber is comprised of (A) about 70 to about 90 phr of brominated copolymer of isobutylene and paramethylstyrene, and (B) about 10 to about 30 phr of at least one diene-based elastomer selected from polymers of isoprene and/or 1,3-butadiene and copolymers of styrene with isoprene and/or 1,3-butadiene.

6. The tire of claim 5 wherein rubber sidewalls individually extending radially from the spaced apart beads to the peripheral edges of said tread are comprised of said tread rubber composition.

7. The tire of claim 5 wherein a thin layer of a rubber composition as a vulcanizable blend of diene-based elastomer(s) and said brominated copolymer of isobutylene and paramethylstyrene, in a weight ratio of from 30/70 to 70/30 of such diene-based elastomer(s) to said brominated copolymer of isobutylene and paramethylstyrene, is positioned between said tread and said carcass.

* * * * *